United States Patent
Yin (10) Patent No.: US 10,001,369 B2
(45) Date of Patent: Jun. 19, 2018

(54) OBJECT-POINT THREE-DIMENSIONAL MEASURING SYSTEM USING MULTI-CAMERA ARRAY, AND MEASURING METHOD

(71) Applicant: Xing Yin, Jiangsu (CN)

(72) Inventor: Xing Yin, Changzhou (CN)

(73) Assignee: BEIJING QINGYING MACHINE VISUAL TECHNOLOGY CO., LTD., Changzhou, Jiangsu (CN)

(*) Notice: Subject to any disclaimer, the term of this patent is extended or adjusted under 35 U.S.C. 154(b) by 189 days.

(21) Appl. No.: 15/118,607

(22) PCT Filed: Apr. 14, 2016

(86) PCT No.: PCT/CN2016/079274
§ 371 (c)(1),
(2) Date: Aug. 12, 2016

(87) PCT Pub. No.: WO2017/124654
PCT Pub. Date: Jul. 27, 2017

(65) Prior Publication Data
US 2018/0051982 A1    Feb. 22, 2018

(30) Foreign Application Priority Data

Jan. 22, 2016 (CN) .......................... 2016 1 0046181
Mar. 8, 2016 (CN) .......................... 2016 1 0131645

(51) Int. Cl.
*H04N 9/47*     (2006.01)
*H04N 7/18*     (2006.01)
(Continued)

(52) U.S. Cl.
CPC ........ *G01B 11/2545* (2013.01); *G01B 11/002* (2013.01); *G01B 11/03* (2013.01);
(Continued)

(58) Field of Classification Search
USPC ........................................................ 348/139
See application file for complete search history.

(56) References Cited

U.S. PATENT DOCUMENTS 8,773,508 B2 *  7/2014  Daniel ...................... G06T 7/55
                                                   348/42
9,769,365 B1 *  9/2017  Jannard ................ H04N 5/2254
(Continued)

FOREIGN PATENT DOCUMENTS

CN    102679961    1/1996
CN    101033966    9/2007
(Continued)

OTHER PUBLICATIONS

Office Action (in Chinese).
Office Action (translated by EPO).

*Primary Examiner* — Chikaodili E Anyikire
(74) *Attorney, Agent, or Firm* — Peter L. Brewer; Thrive IP (57) ABSTRACT

A system for measuring object points on a three-dimensional object using a planar array of a multi-camera group, and a measuring method, are provided. The system is useful in the field of optical measuring technologies. The method includes establishing a measuring system of at least one four-camera group wherein digital cameras form a 2×2 array; matching an image object point acquired by the camera group; upon matched object point image coordinates, calculating coordinates of spatial locations of respective object points; upon coordinates of the spatial locations, calculating other three-dimensional dimensions of the measured object to be specially measured to form three-dimensional point clouds and establish a three-dimensional point clouds graph for performing three-dimensional stereoscopic reproduction. Here, full matching is performed for all measured points of the measured object by directly translating, (Continued)

superimposing, and comparing, point-by-point, the pixel points of measured images in X and Y-axes directions. In this way a three-dimensional object may be reproduced.

14 Claims, 5 Drawing Sheets (51) Int. Cl.
*G01B 11/25* (2006.01)
*G01B 11/00* (2006.01)
*G01B 11/03* (2006.01)
*G01C 11/02* (2006.01)
*G06T 7/593* (2017.01)
*H04N 13/02* (2006.01)
*G06T 7/557* (2017.01)
*G06T 17/00* (2006.01)
*G06T 15/00* (2011.01)

(52) U.S. Cl.
CPC .............. *G01C 11/02* (2013.01); *G06T 7/557* (2017.01); *G06T 7/596* (2017.01); *H04N 13/0275* (2013.01); *H04N 13/0282* (2013.01); *H04N 13/275* (2018.05); *H04N 13/282* (2018.05); *G06T 15/00* (2013.01); *G06T 17/00* (2013.01)

(56) References Cited

U.S. PATENT DOCUMENTS

| | | | |
|---|---|---|---|
| 9,819,863 B2* | 11/2017 | Osborne | H04N 5/23238 |
| 9,891,049 B2* | 2/2018 | Brown | G06T 7/55 |
| 9,894,350 B2* | 2/2018 | Cole | H04N 17/002 |
| 9,911,454 B2* | 3/2018 | van Hoff | G11B 19/20 |
| 2005/0075585 A1 | 4/2005 | Kim et al. | |
| 2007/0081695 A1* | 4/2007 | Foxlin | G06T 7/73 |
| | | | 382/103 |
| 2007/0097249 A1* | 5/2007 | Korenaga | G02B 5/1876 |
| | | | 348/335 |
| 2015/0219437 A1* | 8/2015 | Dowski | G01S 5/16 |
| | | | 701/1 |
| 2015/0367958 A1* | 12/2015 | Lapstun | B64D 47/08 |
| | | | 348/144 |
| 2016/0212409 A1* | 7/2016 | Cole | H04N 13/0022 |
| 2017/0067734 A1* | 3/2017 | Heidemann | G01B 11/2513 |
| 2017/0094259 A1* | 3/2017 | Kouperman | G06T 7/596 |

FOREIGN PATENT DOCUMENTS

| | | |
|---|---|---|
| CN | 101382417 | 3/2009 |
| CN | 101782386 | 7/2010 |
| CN | 103148806 | 6/2013 |
| CN | 103513295 | 1/2014 |
| JP | H08285532 | 11/1996 |
| JP | 2009/058359 | 3/2009 |

* cited by examiner

OBJECT-POINT THREE-DIMENSIONAL MEASURING SYSTEM USING MULTI-CAMERA ARRAY, AND MEASURING METHOD

CROSS REFERENCE TO RELATED APPLICATIONS

This application claims the benefit of International Application PCT/CN2016/079274 filed Apr. 14, 2016. That application is entitled "Feature-Point Three-Dimensional Measuring System of Planar Array of Four-Camera Group and Measuring Method," and is incorporated herein in its entirety by reference.

This application also claims priority to Chinese national patent application CN 2016/10046181.0 filed on Jan. 22, 2016 and Chinese national patent application CN 2016/10131645.8 filed on Mar. 8, 2016.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present invention relates to a three-dimensional measuring system using a multi-camera array. The invention also pertains to the field of optical measuring, and particularly to methods of measuring the position and dimensions of three-dimensional objects using a digital camera group, and calculating three-dimensional coordinates of a viewed object through image processing.

Technology in the Field of the Invention

Different techniques have been used for the measurement of three-dimensional objects. The techniques calculate location coordinate points of a viewed object to produce a three-dimensional stereoscopic measurement of external dimensions or features.

I. The Single-Point Vision Measuring Method

A first technique is the single-point vision measuring method. We can regard all kinds of contactless length measuring sensors as single-point vision sensors. Examples include laser ranging sensors and laser scanners superimposed with a high-speed scanning function.

With single-point high-speed scanning, single-point vision data can be used to produce a three-dimensional stereoscopic image. However, single-point vision measuring methods have disadvantages, particularly, the morphology characteristics of a whole measured object cannot be quickly and entirely grasped. Further, in dynamic measurement, a quickly moving object will produce image deformation, resulting in measurement blind spots. Processing speed of three-dimensional points needs to be improved.

II. The Planar Vision Measuring Method

A second technique is the planar vision measuring method. For planar vision measuring, various types of cameras are used for two-dimensional imaging. These include video cameras and video surveillance. Two-dimensional image on-line measurement is widely used in various assembly line tests, such as printing and packaging line quality tests and product quality and appearance tests for specific objects.

With planar vision measuring, an object within a field of view can be captured through two-dimensional imaging. A produced image of an object is subjected to analysis and intelligence processing through an edge classification algorithm. A drawback to planar vision measuring is that it can be hard to directly calculate physical dimensions of the object according to the plane image. For a three-dimensional test, if only independent image analysis is carried out, it can only make qualitative analysis of the plane exterior profile.

III. Three-Dimensional Vision Measurement

A third technique is three-dimensional vision measurement. There are several types of three-dimensional vision measuring technologies.

Optical Screenshot Technology and Line Laser Measurement

A first type is optical screenshot and laser line technology. Optical screenshot technology and line laser measurement address the three-dimensional measurement by changing it into a two-dimensional problem through establishment of a laser plane. One laser plane is generated by one line laser generator, and an image is subjected to a binarization process after image capture by a digital camera arranged at a certain angle with this plane. An image of an intersecting line of the measured object and the laser line is obtained. The laser plane and pixels of the two-dimensional image have a unique corresponding relationship. Accurate measurement of a laser cut line of the object can be realized through calibration. Currently, a line laser range finder can directly measure distances of various points on a laser line.

Binocular Vision Measuring Technology

A second technology is binocular, or multi-view, vision measuring technology. It is observed here that the reason why the human eye can quickly determine the distance and size of a viewed object is that human beings have two eyes which have a fixed distance and which can dynamically adjust a focal length and an angle. The human brain has a computing speed that is hardly matched by the fastest computer at present. If two cameras with a fixed distance and focal length capture the same object at the same time, with respect to the same measured point of the measured object, there is a unique relationship between images which they form. This is the principle of the binocular vision measurement. Currently, 3D movies substantially use this method for filming and stereoscopic reproduction.

For the binocular vision measuring method, because there are still difficulties in the current technologies of the extraction of edge features of an object and the binocular pixel matching algorithm, it is hard to quickly and accurately match the binocular images. The binocular vision measurement method has not yet been used on a large scale, and products with direct binocular measurement and image recognition have not been seen.

At present, a device which can truly realize direct acquisition of three-dimensional data has not yet appeared. So-called three-dimensional vision is formed through combination of related devices and technologies of one-dimensional and two-dimensional vision. Therefore, a need exists for an improved object-point, three-dimensional measuring system.

BRIEF SUMMARY OF THE INVENTION

The present invention first provides a three-dimensional measuring system for measuring object points. The system uses a multi-camera group positioned in a planar array. The system enables a user to quickly and accurately measure dimensions of a three-dimensional object using a multi-view camera system.

In order to achieve the technical solutions and methods in the present invention, a three-dimensional measuring system is offered. In one embodiment, the system includes an array of cameras having an identical model and identical lenses. In one embodiment, the multi-camera group comprising at least one four-camera group arranged in the form of a 2×2 array. The digital cameras in this array may be denoted as camera A, camera B, camera C, and camera D. The cameras A, B, C and D are arranged on the same plane.

In one embodiment, camera A is located at a position horizontal to camera B, while camera C is located at a position horizontal to camera D. Camera A is located at a position vertical to camera C, while camera B is located at a position vertical to camera D. This forms a four-sided profile.

Focal points $O_a$, $O_b$, $O_c$, and $O_d$ reside on imaging optical axes of the four cameras A, B, C, and D are on the same plane. Thus, cameras A, B, C and D form a polygonal plane, and preferably a rectangular plane, where the imaging optical axis of each of the four cameras A, B, C and D are perpendicular to the polygonal plane.

In one aspect, the array formed by the group of cameras is formed by four digital cameras where a focal point on an imaging optical axis of a chosen camera and focal points on imaging optical axes of three adjacent cameras form a rectangular shape, and all of the imaging optical axis of the four cameras are perpendicular to the rectangular plane.

The multi-camera group may alternatively be provided in a form of 2×3, 2×4, 2×5, 3×2, 3×3, 3×4, 3×5 or 4×4 array.

In the multi-camera group, the cameras may have sensors of a type of ⅔" CMOS, and a pixel dimension of 5.5 μm. In addition, the cameras may have a resolution of 1024×2048, and a lens having a focal length of 25 millimeters.

The system may further comprise at least one vertical laser and at least one horizontal laser. In this instance, the vertical laser is configured to be located on a perpendicular bisector of a connecting line $O_a$-$O_b$, and the horizontal laser is configured to be located on a perpendicular bisector of a connecting line $O_a$-$O_c$.

In the multi-camera group, a distance between two adjacent cameras in a horizontal direction may be denoted as "m", and a distance between two adjacent cameras in a vertical direction may be denoted as "n". Preferably, a range of "m" is 50 to 100 millimeters, while a range of "n" is also 50 to 100 millimeters.

An imaging method based on the three-dimensional measuring system described above is also provided herein. The method first comprises establishing a measuring system according to a three-dimensional planar array of a multi-camera group. The multi-camera group may include four or more identical cameras, whose optical axes are parallel, and whose focal points are on a same plane and form one rectangular profile.

The selection of dimensions of the array and parameters of the cameras and the lenses are selected based on desired accuracy of the measuring system and a size of a measured object. When high measuring accuracy is required, it becomes necessary to improve the resolution of the cameras and increase the focal length of the lenses. It is also desirable to ensure that the measured object is capable of simultaneously having corresponding imaging points on the four cameras. If the measured object is out of the imaging range, the operator may increase the measuring cameras in pairs, forming a larger array of the measuring cameras.

As part of the step of setting up the measuring system, the method also includes acquiring images. It is noted that in the first step of establishing a measuring system and acquiring images, parameters of the cameras and the lenses, and the length and width dimensions of the rectangular shape, are selected. When a measuring distance is unchanged, the larger a volume of the measured object, the shorter the focal length is required for the lenses. When the measuring distance is increased, a measurable range is also correspondingly increased.

Also in connection with this first step, a measuring resolution is improved in a way of (i) improving the resolutions of the cameras, (ii) decreasing the measuring distance, (iii) in a condition that the measuring distance is unchanged, decreasing values of the focal lengths, and (iv) increasing dimensions of an array of centers of the optical axes of the four-camera group.

After acquisition of images is completed, the method next includes performing a matching operation for an object point of the images of the camera group. This is referred to herein as stereoscopic matching. In the binocular stereoscopic vision measurement, stereoscopic matching means that one of the imaging points is known and a corresponding point of this imaging point is found on another image. Epipolar geometric constraint is a common matching constraint technology. We connect three points, the measured point and the imaging points on the corresponding images, to form one plane. Intersecting lines of this plane with the two images in the imaging space are referred to as epipolar. A constraint condition of epipolar is that the matching point(s) must be located on the epipolar.

As to the epipolar algorithm, since in the three-dimensional vision measuring method of a planar array of a multi-camera group, the optical axes of the cameras are parallel, and the focal points form a rectangular shape on the same plane, the epipolar may be simplified as a straight line parallel to the X axis or the Y axis, that is to say, all corresponding projection points of the measured object on respective imaging planes are on the straight line parallel to the X axis or the Y axis. Thus, when performing the matching operation, full matching can be carried out for all measured points of the measured object, by directly translating, superimposing, and comparing, point by point, the pixel points of measured images of each pair in X-axis and Y-axis directions.

In the matching operation, it is required to make the matching operations on the images of the multi-camera group, finding out all object points whose spatial locations need to be calculated. If a camera array having more than four cameras is used for measurement, different matching operations should be performed in different four-camera groups, respectively.

A third step in the measuring method is calculating coordinates of a spatial location of the object point. This is done according to matched object point image coordinates. In operation, the matched object point image coordinates are put into coordinate expressions of any object point $P_N$ in a space of the measured object, to calculate coordinates of spatial locations of respective object points.

According to calculation formulas of the spatial location of the object point $P_N$, a width dimension of the measured object is calculated through matched object points between two pairs of horizontal cameras. In addition, a height dimension of the measured object is calculated through matched object points between two pairs of vertical cameras. Finally, a length dimension of the measured object is calculated through matched object points between two pairs of horizontal cameras and two pairs of vertical cameras. In this instance, all of the dimensions above, having a redundant feature, are compared and analyzed on redundant data, improving measuring accuracy and precision rate.

In the third step of calculating coordinates of the spatial location of the object point, it is observed that formulas of calculating coordinates of the spatial location of respective object points are:

with a central point O of a rectangular plane of the focal points $O_a$, $O_b$, $O_c$, and $O_d$ of a group of four cameras, the camera A, the camera B, the camera C, and the camera D, serving as an origin, setting a triangular coordinate system of the space of the measured object, wherein X is a horizontal direction, Y is a vertical direction, and Z is a length or depth direction;

coordinates of a spatial location of a same point, point $P_1$, of the measured object are $P_1$ ($P_{1x}$, $P_{1y}$, $P_{1z}$), and corresponding imaging points of the spatial three-dimensional coordinates of the point $P_1$ in the group of four cameras A, B, C and D are $P_{1a}$ ($P_{1ax}$, $P_{1ay}$), $P_{1b}$ ($P_{1bx}$, $P_{1by}$), $P_{1c}$ ($P_{1cx}$, $P_{1cy}$), and $P_{1d}$ ($P_{1dx}$, $P_{1dy}$), relational expressions of location coordinates are as follows:

a horizontal operation formula of camera A and camera B:

$$P_{1x} = \frac{m(P_{1ax} + P_{1bx})}{2(P_{1bx} - P_{1ax})}$$

a horizontal operation formula of camera C and camera D:

$$P_{1x} = \frac{m(P_{1cx} + P_{1dx})}{2(P_{1dx} - P_{1cx})}$$

a vertical operation formula of camera A and camera C:

$$P_{1y} = \frac{n(P_{1cy} + P_{1ay})}{2(P_{1cy} - P_{1ay})}$$

a vertical operation formula of camera B and camera D:

$$P_{1y} = \frac{n(P_{1by} + P_{1dy})}{2(P_{1dy} - P_{1by})}$$

a depth operation formula of camera A and camera B:

$$P_{1z} = \frac{mf}{P_{1cx} - P_{1dx}}$$

a depth operation formula of camera C and camera D:

$$P_{1z} = \frac{mf}{P_{1cx} - P_{1dx}}$$

a depth operation formula of camera A and camera C:

$$P_{1z} = \frac{nf}{P_{1ay} - P_{1cy}}$$

a depth operation formula of camera B and camera D:

$$P_{1z} = \frac{nf}{P_{1by} - P_{1dy}}$$

wherein: "m" is an $O_a$-$O_b$ length of the rectangular plane; "n" is an $O_a$-$O_c$ length of the rectangular plane, and "f" is the focal length of the four cameras.

For the third step of calculating coordinates of the spatial location of the object points, in a general expression for calculating coordinates of an object point, the spatial location coordinates of $P_N$, is:

$P_N(P_{Nx}, P_{Ny}, P_{Nz})$, where $N = 1, 2, 3, 4, 5, \ldots =$ $$\begin{cases} P_{Nx} = \dfrac{m(P_{Nax} + P_{Nbx})}{2(P_{Nbx} - P_{Nax})} = \dfrac{m(P_{Ncx} + P_{Ndx})}{2(P_{Ndx} - P_{Ncx})} \\ P_{Ny} = \dfrac{n(P_{Ncy} + P_{Nay})}{2(P_{Ncy} - P_{Nay})} = \dfrac{n(P_{Nby} + P_{Ndy})}{2(P_{Ndy} - P_{Nby})} \\ P_{Nz} = \dfrac{mf}{P_{Nax} - P_{Nbx}} = \dfrac{mf}{P_{Ncx} - P_{Ndx}} = \dfrac{nf}{P_{Nay} - P_{Ncy}} = \dfrac{nf}{P_{Nby} - P_{Ndy}} \end{cases}$$

wherein let the focal points of the four cameras (the camera A, the camera B, the camera C and the camera D) be $O_a$, $O_b$, $O_c$, and $O_d$, wherein the focal points $O_a$, $O_b$, $O_c$, and $O_d$ are on the same rectangular plane, let the $O_a$-$O_b$ length of the rectangular plane be "m" and the $O_a$-$O_c$ length be "n", with the optical axes of the four cameras being parallel to each other and perpendicular to the rectangular plane, wherein the group of four cameras A, B, C and D, use identical cameras having identical lenses for imaging, and let the focal length of the lenses be set to be "f";

setting a rectangular coordinate system of the space of the measured object, taking the central point O of the rectangular plane of $O_a$, $O_b$, $O_c$, and $O_d$ as the origin, wherein X is a horizontal direction parallel to an edge $O_a$-$O_b$ of the rectangular shape, Y is a vertical direction parallel to an edge $O_a$-$O_c$ of the rectangular shape, and Z is a length or depth direction and points towards the measured object; and let any object point in the measured object be $P_N$, and coordinates of projection points of $P_N$ on imaging planes of the group of four cameras A, B, C and D, be $P_{Na}$ ($P_{Nax}$, $P_{Nay}$), $P_{Nb}$ ($P_{Nbx}$, $P_{Nby}$), $P_{Nc}$ ($P_{Ncx}$, $P_{Ncy}$), and $P_{Nd}$ ($P_{Ndx}$, $P_{Ndy}$), and then, let coordinates of a spatial location of the point $P_N$ be $P_N$ ($P_{Nx}$, $P_{Ny}$, $P_{Nz}$).

Finally, a fourth step of the method includes calculating other three-dimensional dimensions of the measured object which need to be specially measured to form three-dimensional data points (or point clouds) and establish a three-dimensional point clouds graph for performing three-dimensional stereoscopic reproduction. This is done according to obtained coordinates of the spatial locations of respective object points.

By using the technical solutions and the methods of the present invention, since four or more digital cameras are arranged in a rectangular array on the same plane, after the multi-view matching algorithm is completed and respective corresponding object points are found out, coordinates of a three-dimensional location of the object point of the viewed object are quickly and accurately calculated using the methods, to further realize accurate three-dimensional stereoscopic imaging of the external dimensions of a viewed object. Apart from being capable of quickly calculating the three-dimensional coordinates of the object point, since the arrangement of the planar array of the four-camera group is used, the methods can simplify the matching algorithm of the object point.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Below, the technical solutions and the methods of the present invention are further described in detail in conjunction with figures for understanding aspects of the present invention.

Figure 1:
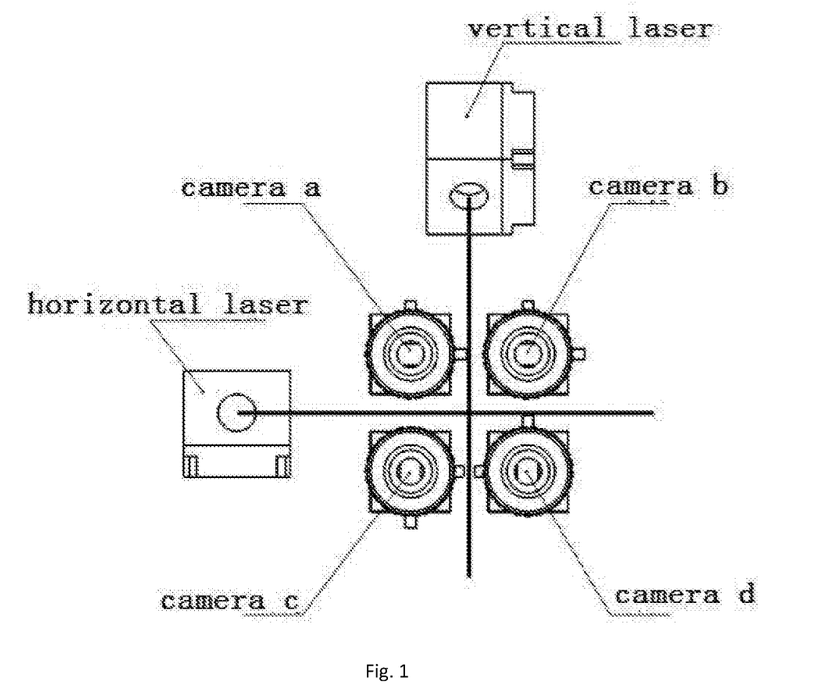
FIG. 1 is a plan schematic view of an arrangement of a planar, four-camera array for the system of the present invention.
Figure 2:
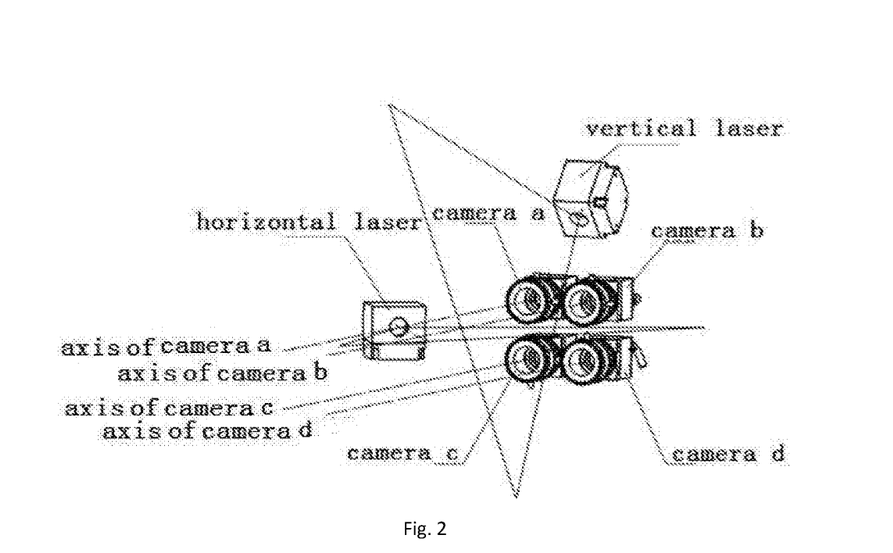
FIG. 2 is a perspective view of the planar, four-camera array of FIG. 1.
Figure 3:
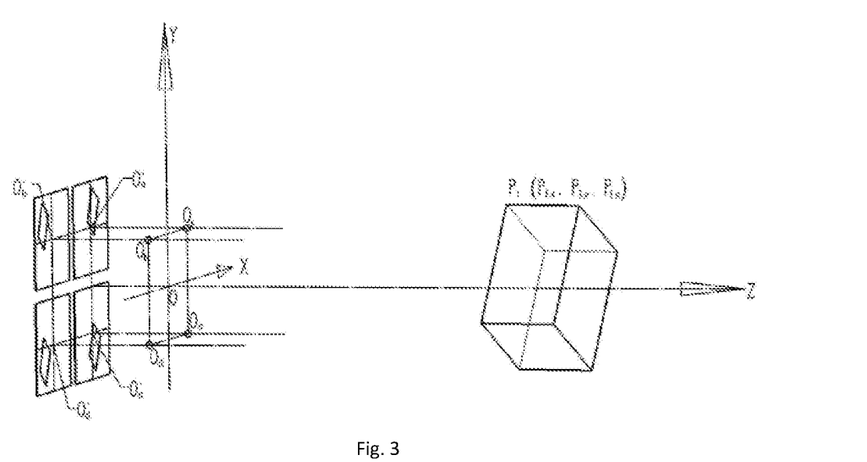
FIG. 3 is a schematic view of an arrangement of a coordinate system of the planar, four-camera array of the present invention.

As shown in FIG. 1, FIG. 2, and FIG. 3, a three-dimensional measuring system using a multi-camera group is provided. The group of cameras is used to identify and measure object points on a three-dimensional object. The group is formed by an array of at least four digital cameras. In one aspect, the digital cameras are arranged in a 2×2 array. The digital cameras comprise a camera A, a camera B, a camera C and a camera D, wherein the cameras A, B, C and D are arranged on the same plane.

Focal points $O_a$, $O_b$, $O_c$, and $O_d$ on imaging optical axes of the four cameras (the camera A, the camera B, the camera C and the camera D), are on the same plane and form one rectangular shape, forming a rectangular plane. Cameras A, B, C and D are respectively located at four corners of the rectangular shape (as in FIG. 1, FIG. 2, and FIG. 3). Thus, all of imaging optical axis of the four cameras A, B, C and D are perpendicular to the rectangular plane.

The four cameras A, B, C and D are preferably of identical models and have identical lenses. A distance between two cameras, forming the length or width dimensions of a rectangular shape, can be adjusted. For the selection of resolutions of the cameras and other parameters, focal lengths of the lenses, and length and width dimensions of the rectangular shape, suitable parameters should be selected, according to a location and dimensions of the measured object. The operator should ensure that all cameras within the array are within the field of view so as to be able to take an image of the measured object, at the same time, and being capable of meeting requirements of measurement accuracy to resolutions of the images.

At least one vertical laser and at least one horizontal laser are further comprised. The so-called vertical laser is a laser provided in a vertical direction, while the so-called horizontal laser is a laser provided in a horizontal direction. Gas lasers, solid-state lasers, semiconductor lasers, free electron lasers or pulsed lasers can be chosen as the lasers.

As shown in FIGS. 1 and 2, the camera A is located on a position horizontal to camera B, while camera C is located on a position horizontal to camera D (parallel to camera A and camera B). The vertical laser is configured to be located on a perpendicular bisector of a connecting line of $O_a$ and $O_b$. The vertical laser is located at the top of camera A and camera B, with a distance of 1 to 3 times the length of a connecting line of the focal points of camera A and camera B.

As also shown in FIGS. 1 and 2, camera A is located on a position vertical to camera C, while camera B is located on a position vertical to camera D (parallel to camera A and camera C). The horizontal laser is configured to be located on a perpendicular bisector of a connecting line of $O_a$ and $O_c$. The horizontal laser is located at the left of camera A and camera C, with a distance of 1 to 3 times the length of the connecting line of the focal points of camera A and camera C.

The camera group of digital cameras is formed by four digital cameras where a focal point on an imaging optical axis of a chosen camera and focal points on imaging optical axes of three adjacent cameras form one rectangular shape, forming a rectangular plane. Moreover, all of the imaging optical axis of the four cameras are perpendicular to this rectangular plane.

The multi-camera group may be provided in a form of a 2×3, a 2×4, a 2×5, a 3×2, a 3×3, a 3×4, a 3×5 or a 4×4 array. In order to be capable of measuring objects at different positions having different external dimensions and meeting requirements of different levels of measurement accuracy, in the vision measuring system, as demanded, the 2×2 array of the four-camera group is in pair arranged into an array of cameras in accordance with a rectangular shape for expanding, so as to enlarge the measured range of view field. The array of the four-camera group is a 2×2 array. If the lateral range of the view field is increased, another pair of cameras can be further arranged in the lateral direction, turning into a 3×2 array.

A principle of the arrangement of the measuring camera array is that a focal point on an imaging optical axis of a camera and focal points on imaging optical axes of three adjacent cameras form one rectangular shape, and all of the imaging optical axis of the cameras are perpendicular to the rectangular plane.

Another principle of the arrangement of the measuring camera array is that, for an object point which needs to be measured, corresponding matching points can be found in all images in the camera array, at least in one four-camera 2×2 array.

A calculating principle of the measuring camera array is that calculation of image matching and calculation of three-dimensional coordinates are performed on the basis of the 2×2 array of the four-camera group. If one pair of cameras is adjacent to two other pairs of cameras in the horizontal direction or the vertical direction respectively, this pair of cameras can take part in operations of the 2×2 arrays of the four-camera group with the other two pairs of cameras adjacent to them, respectively.

In the object-point measuring method of a planar array of a multi-camera group, one or more vertical line laser generators (i.e. vertical lasers) or horizontal line laser generators (i.e. horizontal lasers) can be provided. This is also shown in FIG. 1 and FIG. 2. The purpose of the one or more vertical line laser generators or horizontal line laser generators is being capable of quickly and accurately performing matching of the four-camera group image versus the same measured point on the intersecting line of the laser and the viewed object through laser-structured light. (Since the laser light has high illuminance compared with a common light source, it is easy to obtain on the image a graph of the intersecting line with the object, moreover, it is easy to calculate three-dimensional coordinates of the intersecting line according to the optical screenshot principle, without ambiguity. Similar to an indicating line, it facilitates image matching. From another perspective, if the images are directly matched, the algorithm is complex, easily causing matching error and hard to guarantee uniqueness.) But if the line laser generator is not provided, the measurement results will not be affected as long as quick matching of the image object point can be realized. Sometimes, in order to meet the requirements of measuring speed and accuracy, a plurality of horizontal or vertical laser lines can be arranged. It is recommended to use an arrangement manner of arranging laser lines parallel to each other.

In the four-camera group, the cameras may have sensors of a type of ⅔" CMOS, and a pixel dimension of 5.5 µm. In addition, the cameras may have a resolution of 1024×2048, and a focal length of lens of 25 millimeters.

In the four-camera group, a distance between two adjacent cameras in a horizontal direction is denoted as "m", and a distance between two adjacent cameras in a vertical direction is denoted as "n". A range of "m" may be 50 to 100 millimeters, and more preferably about 60 millimeters. A range of "n" may be 50 to 100 millimeters, and more preferably about 50 millimeters.

A measuring method based on the above mentioned three-dimensional measuring system comprises the following specific steps:

Step 1: Establishing a measuring system and acquiring images according to a three-dimensional vision measuring method using a multi-camera array.

A principle of the establishing step is that there are provided four or more identical cameras, whose optical axes are parallel, and whose focal points are on the same plane and can form one rectangular shape. For the selection of dimensions of the rectangular shape and parameters of the cameras and the lenses, mainly considering factors are accuracy of the measuring system and a size of a measured object, wherein when high measuring accuracy is required, it is considered to improve the resolutions of the cameras and increase the focal lengths of the lenses, at the same time, it is needed to ensure that the measured object can simultaneously have corresponding imaging points on the four cameras, and if the measured object is out of the imaging range, it also can be considered to increase the measuring cameras in pair, forming an array of the measuring cameras.

It is noted that in the first step of establishing a measuring system, parameters of the cameras and the lenses, and the length and width dimensions of the rectangular shape, are selected. When a measuring distance is unchanged, the larger a volume of the measured object, the shorter the focal lengths required by the lenses. When the measuring distance is increased, a measurable range is also correspondingly increased.

Also in connection with this first step, a measuring resolution is improved in a way of (i) improving the resolutions of the cameras, (ii) decreasing the measuring distance, (iii) in a condition that the measuring distance is unchanged, decreasing values of the focal lengths, and (iv) increasing dimensions of an array of centers of the optical axes of the four-camera group.

As part of the step of setting up the measuring system, the method also includes acquiring images.

Step 2: After acquisition of images is completed, performing a matching operation for an object point of the images of the camera group.

A matching algorithm for imaging points of the measured object on the image is carried out. This is done with reference to a process or algorithm using a processor. Since we use the multi-camera redundant and specifically structured arrangement method, corresponding matching is performed for the imaging points of the measured object on the images using the binocular and multi-view image matching algorithm; as to the epipolar algorithm in the binocular vision matching algorithm, the epipolar is directly simplified as a straight line parallel to an X axis and a Y axis, that is to say, all corresponding projection points of the measured object on respective imaging planes are on the straight line parallel to the X axis and the Y axis; full matching is carried out for all measured points of the measured object, by directly translating, superimposing, and comparing, point by point, the pixel points of measured images of each pair in X-axis and Y-axis directions. This method simplifies the otherwise complex algorithm of binocular matching.

In the binocular stereoscopic vision measurement, stereoscopic matching means that one of the imaging points is known and a corresponding point of this imaging point is found on another image. Epipolar geometric constraint is a common matching constraint technology. We connect three points, the measured point and the imaging points on the corresponding images, to form one plane. Intersecting lines of this plane with the two images in the imaging space are called as epipolar by us. A constraint condition of epipolar is that the matching point(s) must be located on the epipolar.

As to the epipolar algorithm, since in the three-dimensional vision measuring method of a planar array of a multi-camera group, the optical axes of the cameras are parallel, and the focal points form a rectangular shape on the same plane, the epipolar is directly simplified as a straight line parallel to the X axis or the Y axis, that is to say, all corresponding projection points of the measured object on respective imaging planes are on the straight line parallel to the X axis or the Y axis; thus, when performing the matching operation, full matching can be carried out for all measured points of the measured object, by directly translating, superimposing, and comparing, point by point, the pixel points of measured images of each pair in X-axis and Y-axis directions.

In the matching operation, it is required to make the matching operations on the images of the four-camera group, finding out all object points whose spatial locations need to be calculated, and if a camera array having more than four cameras is used for measurement, different matching operations should be performed in different four-camera groups respectively.

Step 3: According to matched object point image coordinates, calculating coordinates of a spatial location of the object point.

In step 3, the matched object point image coordinates are put into coordinate expressions of any object point $P_N$ in the space of the measured object, to calculate coordinates of spatial locations of respective object points. According to calculation formulas of the spatial location of the object point, a width dimension of the measured object can be calculated through the matched object points between two pairs of horizontal cameras, a height dimension of the measured object can be calculated through the matched object points between two pairs of vertical cameras, and a length dimension of the measured object can be calculated through the matched object points between two pairs of horizontal cameras and two pairs of vertical cameras. All of the dimensions above, having a redundant feature, can be compared and analyzed on the redundant data, improving the measuring accuracy and precision rate;

In the third step of calculating coordinates of the spatial location of the object point, it is observed that formulas of calculating coordinates of the spatial location of respective object point are:

with a central point O of a rectangular plane of the focal points $O_a$, $O_b$, $O_c$, and $O_d$ of a group of four cameras, the camera A, the camera B, the camera C, and the camera D, serving as an origin, setting a triangular coordinate system of the space of the measured object, wherein X is a horizontal direction, Y is a vertical direction, and Z is a length or depth direction;

coordinates of a spatial location of a same point, point $P_1$, of the measured object are $P_1$ ($P_{1x}$, $P_{1y}$, $P_{1z}$), and corresponding imaging points of the spatial three-dimensional coordinates of the point $P_1$ in the group of four cameras A, B, C and D are $P_{1a}$ ($P_{1ax}$, $P_{1ay}$), $P_{1b}$ ($P_{1bx}$, $P_{1by}$), $P_{1c}$ ($P_{1cx}$, $P_{1cy}$), and $P_{1d}$ ($P_{1dx}$, $P_{1dy}$), relational expressions of location coordinates are as follows:

a horizontal operation formula of camera A and camera B:

$$P_{1x} = \frac{n(P_{1ax} + P_{1bx})}{2(P_{1bx} - P_{1ax})}$$

a horizontal operation formula of camera C and camera D:

$$P_{1x} = \frac{m(P_{1cx} + P_{1dx})}{2(P_{1dx} - P_{1cx})}$$

a vertical operation formula of camera A and camera C:

$$P_{1y} = \frac{n(P_{1cy} + P_{1ay})}{2(P_{1cy} - P_{1ay})}$$

a vertical operation formula of camera B and camera D:

$$P_{1y} = \frac{n(P_{1by} + P_{1dy})}{2(P_{1dy} - P_{1by})}$$

a depth operation formula of camera A and camera B:

$$P_{1z} = \frac{mf}{P_{1cx} - P_{1dx}}$$

a depth operation formula of camera C and camera D:

$$P_{1z} = \frac{mf}{P_{1cx} - P_{1dx}}$$

a depth operation formula of camera A and camera C:

$$P_{1z} = \frac{nf}{P_{1ay} - P_{1cy}}$$

a depth operation formula of camera B and camera D:

$$P_{1z} = \frac{nf}{P_{1by} - P_{1dy}}$$

wherein: "m" is an $O_a$-$O_b$ length of the rectangular plane; "n" is an $O_a$-$O_c$ length of the rectangular plane, and "f" is the focal length of the four cameras.

Step 4: According to the obtained coordinates of the spatial locations of respective object points, calculating other three-dimensional dimensions of the measured object which need to be specially measured to form three-dimensional point clouds and establish a three-dimensional point clouds graph for performing three-dimensional stereoscopic reproduction.

Figure 4:
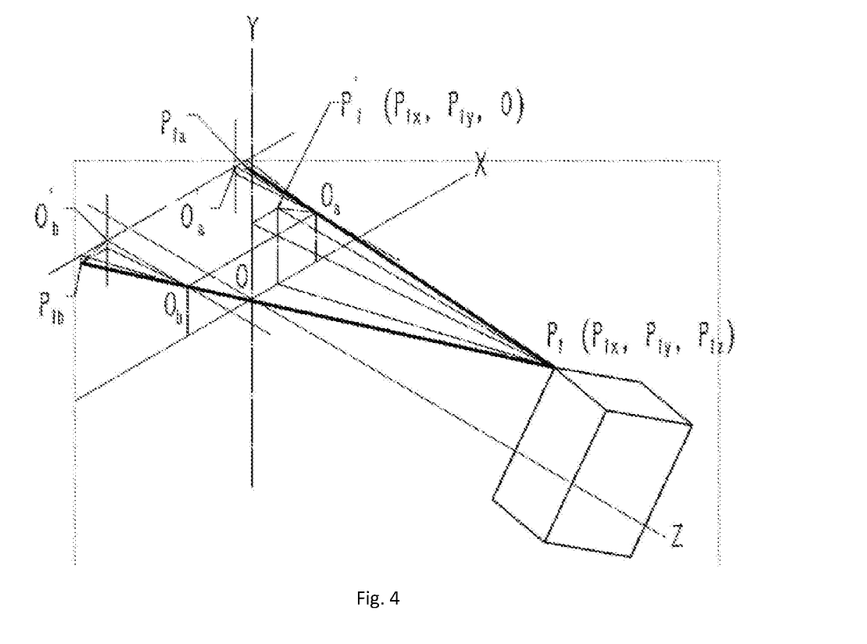
FIG. 4 is a perspective schematic view of calculating horizontal dimensions of the four-camera array of the present invention.
Figure 5:
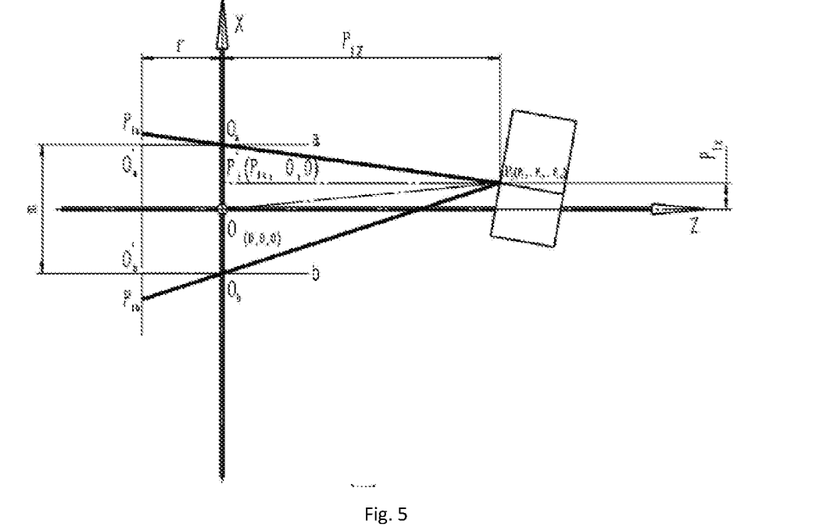
FIG. 5 is a plan schematic view of calculating horizontal dimensions of the four-camera array of the present invention.
Figure 6:
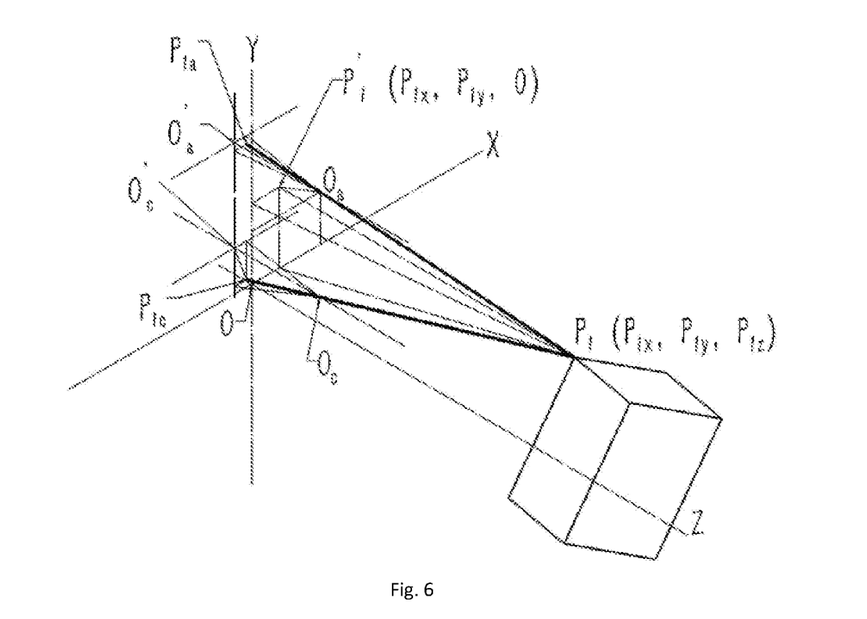
FIG. 6 is a perspective schematic view of calculating vertical dimensions of the four-camera array of the present invention.
Figure 7:
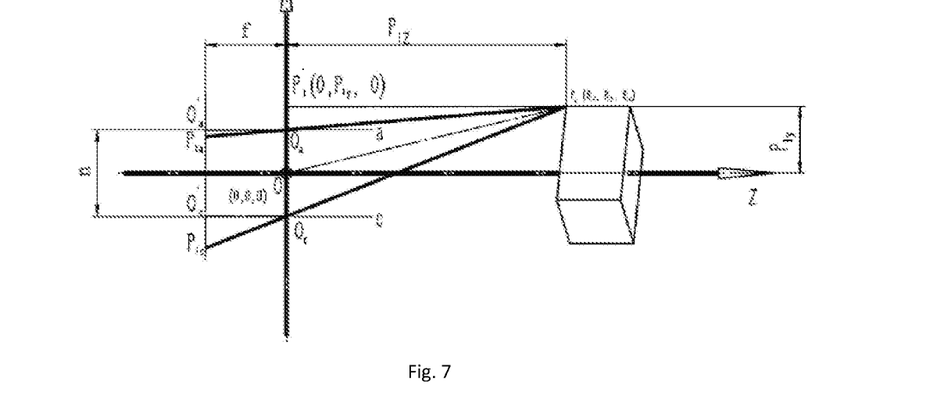
FIG. 7 is a plan schematic view of calculating vertical dimensions of the four-camera array of the present invention.

See FIG. 3, FIG. 4, FIG. 5, FIG. 6, and FIG. 7 for the three-dimensional stereoscopic vision measuring principle of the present invention, wherein FIG. 4 and FIG. 5 are schematic views of calculating horizontal dimensions of camera A and camera B, and FIG. 6 and FIG. 7 are schematic views of calculating vertical dimensions of camera A and the camera C.

We take FIG. 3, FIG. 4, FIG. 5, FIG. 6, and FIG. 7 as examples to describe the measuring principle.

In FIG. 3, let the focal points of the group of four cameras, A, B, C, and D, be $O_a$, $O_b$, $O_c$, and $O_d$, the focal points $O_a$, $O_b$, $O_c$, and $O_d$ are on the same plane and form one rectangular plane. Let the $O_a$-$O_b$ length of the rectangular plane be "m", and the $O_a$-$O_c$ length be "n". The optical axes of the four-camera group are parallel to each other and perpendicular to this rectangular plane. The four cameras A, B, C, and D use identical Charge-coupled Device (CCD) imaging, and also have identical lenses with a focal length set to be f. Let centers of imaging planes of the CCD imaging of the four-camera group of A, B, C, and D be $O_a{}'$, $O_b{}'$, $O_c{}'$, and $O_d{}'$.

Let one object point of the measured object be $P_1$. We take the central point O of the rectangular plane of $O_a$, $O_b$, $O_c$, and $O_d$ as an origin, and set the triangular coordinate system of the space of the measured object, wherein X is a horizontal direction, Y is a vertical direction, and Z is a length or depth direction, and then, let coordinates of the spatial location of the point $P_1$ be $P_1$ ($P_{1x}$, $P_{1y}$, $P_{1z}$).

As in FIG. 4, only positional relationships of spatial imaging of camera A and camera B are described. Let imaging points of the point $P_1$ on the imaging planes of the camera a and the camera b be $P_{1a}$ and $P_{1b}$, a projection point of the point $P_1$ on a coordinate XY axis plane be $P_1{}'$ with coordinates thereof being $P_1{}'$ ($P_{1x}$, $P_{1y}$, 0). According to the imaging principle, a connecting line of the point P1 and P1a passes through the point $O_a$, and a connecting line of the point $P_1$ and $P_{1b}$ passes through the point $O_b$. Taking $O_a{}'$ and $O_b{}'$ as centers, coordinate systems of imaging planes of the camera a and the camera b having directions consistent with those of the coordinate axes of the spatial coordinate system OXYZ of the object are set respectively, and then, coordinates of $P_{1a}$ are ($P_{1ax}$, $P_{1ay}$), and coordinates of P1b are $P_{1b}$ ($P_{1bx}$, $P_{1by}$).

As in FIG. 5, geometrical relationships of projections of the three points $P_{1a}$, $P_{1b}$, and $P_1$ in an XZ coordinate plane are described. According to the triangle similarity principle, we obtain:

$$\frac{P_{1z}}{f} = \frac{\frac{m}{2} - P_{1x}}{P_{1ax}} \quad \text{①}$$

$$\frac{P_{1z}}{f} = \frac{\frac{m}{2} + P_{1x}}{-P_{1bx}} \quad \text{②}$$

According to Equations ① and ②, $$\frac{\frac{m}{2} - P_{1x}}{P_{1ax}} = \frac{\frac{m}{2} + P_{1x}}{-P_{1bx}} \quad \text{③}$$

$$-P_{1bx}\left(\frac{m}{2} - P_{1x}\right) = \left(\frac{m}{2} + P_{1x}\right)P_{1ax}$$

$$-\frac{m}{2}P_{1bx} + P_{1bx}P_{1x} = \frac{m}{2}P_{1ax} + P_{1ax} \times P_{1x}$$

$$P_{1x} = \frac{m(P_{1ax} + P_{1bx})}{2(P_{1bx} - P_{1ax})}$$

According to Equations ① and ②, $$P_{1ax}\frac{P_{1z}}{f} = \frac{m}{2} - \frac{m(P_{1ax} + P_{1bx})}{2(P_{1bx} - P_{1ax})} \quad \text{④}$$

$$2P_{1ax}P_{1z}(P_{1bx} - P_{1ax}) = mf(P_{1bx} - P_{1ax} - P_{1ax} - P_{1bx})$$

$$P_{1z} = \frac{-2P_{1ax}mf}{2(P_{1bx} - P_{1ax})P_{1ax}} = \frac{mf}{P_{1ax} - P_{1bx}}$$

As in FIG. 6, only positional relationships of spatial imaging of the camera a and the camera c are described. Let an imaging point of the point $P_1$ on the imaging plane of the camera c be $P_{1c}$, a projection point of the point $P_1$ on the coordinate XY axis plane be Pr and its coordinates be $P^{1\prime}$ ($P_{1x}$, $P_{1y}$, 0). According to the imaging principle, a connecting line of the point $P_1$ and $P_{1c}$ passes through the point $O_c$. Taking $O_c{}'$ as a center, an coordinate system of the imaging plane of the camera c having directions consistent with those of the coordinate axes of the spatial coordinate system OXYZ of the object is set, wherein coordinates of $P_{1c}$ are $P_{1c}$ ($P_{1cx}$, $P_{1cy}$).

As in FIG. 7, geometrical relationships of projections of the three points $P_{1a}$, $P_{1c}$, and $P_1$ in a YZ coordinate plane are described. According to the triangle similarity principle, we obtain:

$$\frac{P_{1z}}{f} = \frac{P_{1y} - \frac{n}{2}}{-P_{1ay}} \quad \text{⑤}$$

$$\frac{P_{1z}}{f} = \frac{\frac{n}{2} + P_{1y}}{-P_{1cy}} \quad \text{⑥}$$

According to Equations ⑤ and ⑥, $$\frac{P_{1y} - \frac{n}{2}}{P_{1ay}} = \frac{\frac{n}{2} + P_{1y}}{P_{1cy}} \quad \text{⑦}$$

$$P_{1cy}\left(P_{1y} - \frac{n}{2}\right) = \left(\frac{n}{2} + P_{1y}\right)P_{1ay}$$

$$P_{1cy}P_{1y} - \frac{n}{2}P_{1cy} = \frac{n}{2}P_{1ay} + P_{1ay} \times P_{1y}$$

$$P_{1y} = \frac{n(P_{1cy} + P_{1ay})}{2(P_{1cy} - P_{1ay})}$$

According to Equations ⑤ and ⑦, $$P_{1ay}\frac{P_{1z}}{f} = \frac{n}{2} - \frac{n(P_{1cy} + P_{1ay})}{2(P_{1cy} - P_{1ay})} \quad \text{⑧}$$

$$2P_{1ay}P_{1z}(P_{1cy} - P_{1ay}) = nf(P_{1cy} - P_{1ay} - P_{1cy} - P_{1ay})$$

$$P_{1z} = \frac{-2P_{1ay}nf}{2P_{1ay}(P_{1cy} - P_{1ay})} = \frac{nf}{(P_{1ay} - P_{1cy})}$$

According to formulas ③, ④, ⑦, and ⑧, through paired operations of the cameras a and b and the cameras a and c respectively, we obtain expression calculation formulas of the coordinates $P_{1x}$, $P_{1y}$, and $P_{1z}$ of a spatial location of the point $P_1$ in regard to the coordinates of the projection points $P_{1a}$ and $P_{1b}$, and $P_{1c}$ of the point $P_1$ on the cameras A, B, and C.

When the camera group is measuring the horizontal dimensions, the cameras A and B or the cameras C and D can be used for the paired operations, and the operation principles and methods of the cameras c and d are identical with those of the cameras A and B. When the camera group measuring the vertical dimensions, the cameras A and C or the cameras B and D can be used for the paired operations, and the operation principles and methods of the cameras b and d are identical with those of the cameras A and C.

The measuring formulas are summarized as follows:

Taking the central point O of the rectangular plane of the focal points $O_a$, $O_b$, $O_c$, and $O_d$ of the group of four cameras A, B, C, and D as an origin, the triangular coordinate system of the space of the measured object is set wherein: X is the horizontal direction, Y is the vertical direction, and Z is the length or depth direction.

The coordinates of the spatial location of the same point of the measured object, point $P_1$, are $P_1$ ($P_{1x}$, $P_{1y}$, $P_{1z}$). Relationship expressions of the spatial three-dimensional coordinates of the point $P_1$ in regard to the location coordinates of the corresponding imaging points $P_{1a}$, $P_{1b}$, $P_{1c}$, and $P_{1d}$ in the group of four cameras A, B, C and D are as follows (where "m" is the $O_a$-$O_b$ length and "n" is the $O_a$-$O_c$ length of the rectangular plane, and "f" is the focal length of the four cameras):

the horizontal operation formula of camera A and camera B:

$$P_{1x} = \frac{m(P_{1ax} + P_{1bx})}{2(P_{1bx} - P_{1ax})}$$

the horizontal operation formula of camera C and camera D:

$$P_{1x} = \frac{m(P_{1cx} + P_{1dx})}{2(P_{1dx} - P_{1cx})}$$

the vertical operation formula of camera A and camera C:

$$P_{1y} = \frac{n(P_{1cy} + P_{1ay})}{2(P_{1cy} - P_{1ay})}$$

the vertical operation formula of camera B and camera D:

$$P_{1y} = \frac{n(P_{1by} + P_{1dy})}{2(P_{1dy} - P_{1by})}$$

the depth operation formula of camera A and camera B:

$$P_{1z} = \frac{mf}{P_{1cx} - P_{1dx}}$$

the depth operation formula of camera C and camera D:

$$P_{1z} = \frac{mf}{P_{1cx} - P_{1dx}}$$

the depth operation formula of camera A and camera C:

$$P_{1z} = \frac{nf}{P_{1ay} - P_{1cy}}$$

the depth operation formula of camera B and camera D:

$$P_{1z} = \frac{nf}{P_{1by} - P_{1dy}}$$

wherein: "m" is an Oa-Ob length of the rectangular plane; "n" is an Oa-Oc length of the rectangular plane, and "f" is the focal length of the four cameras.

In the step 3, a general expression for calculating coordinates of an object point, the spatial location coordinates of $P_N$, is as follows:

let the focal points of the four cameras (the camera A, the camera B, the camera C and the camera D) be Oa, Ob, Oc, and Od, wherein the focal points Oa, Ob, Oc, and Od are on the same rectangular plane, let the Oa-Ob length of the rectangular plane be "m" and the Oa-Oc length be "n", with the optical axes of the four cameras being parallel to each other and perpendicular to the rectangular plane, wherein the group of four cameras A, B, C and D, use identical cameras having identical lenses for imaging, and let the focal length of the lenses be set to be "f";

setting a rectangular coordinate system of the space of the measured object, taking the central point O of the rectangular plane of $O_a$, $O_b$, $O_c$, and $O_d$ as the origin, wherein X is a horizontal direction parallel to an edge $O_a$-$O_b$ of the rectangular shape, Y is a vertical direction parallel to an edge $O_a$-$O_c$ of the rectangular shape, and Z is a length or depth direction and points towards the measured object; and let any object point in the measured object be $P_N$, and coordinates of projection points of $P_N$ on imaging planes of the group of four cameras A, B, C and D, be $P_{Na}$ ($P_{Nax}$, $P_{Nay}$), $P_{Nb}$ ($P_{Nbx}$, $P_{Nby}$), $P_{Nc}$ ($P_{Ncx}$, $P_{Ncy}$), and $P_{Nd}$ ($P_{Ndx}$, $P_{Ndy}$), and then, let coordinates of a spatial location of the point $P_N$ be $P_N$ ($P_{Nx}$, $P_{Ny}$, $P_{Nz}$).

Generally, in the object-point three-dimensional measuring method of a planar array of a multi-camera group, an expression of coordinates of any object point $P_N$ in the space of the measured object are as follows:

$$P_N(P_{Nx}, P_{Ny}, P_{Nz}), \text{ where } N = 1, 2, 3, 4, 5, \ldots =$$

$$\begin{cases} P_{Nx} = \frac{m(P_{Nax} + P_{Nbx})}{2(P_{Nbx} - P_{Nax})} = \frac{m(P_{Ncx} + P_{Ndx})}{2(P_{Ndx} - P_{Ncx})} \\ P_{Ny} = \frac{n(P_{Ncy} + P_{Nay})}{2(P_{Ncy} - P_{Nay})} = \frac{n(P_{Nby} + P_{Ndy})}{2(P_{Ndy} - P_{Nby})} \\ P_{Nz} = \frac{mf}{P_{Nax} - P_{Nbx}} = \frac{mf}{P_{Ncx} - P_{Ndx}} = \frac{nf}{P_{Nay} - P_{Ncy}} = \frac{nf}{P_{Nby} - P_{Ndy}} \end{cases}$$

The present invention offers at least the following advantages:

1. The three-dimensional vision measuring method of a planar array of a multi-camera group can calculate the three-dimensional stereoscopic coordinates of the same point of the measured object according to changes of positions of the imaging points of the same point of the measured object in different cameras, wherein horizontal dimensions are calculated by two pairs of horizontally arranged cameras, vertical dimensions are calculated by two pairs of vertically arranged cameras, and depth dimensions can be calculated by both two pairs of horizontal cameras and two pairs of vertical cameras.

2. The three-dimensional vision measuring method of a planar array of a multi-camera group can calculate the three-dimensional stereoscopic data of the object point of the measured object just through algebraic calculations between the object point image coordinates. The calculation accuracy of the coordinates of the same point of the measured object is only related to the camera accuracy and resolution, mutual positional accuracy and distance of the cameras. Compared with the existing optical screenshot algorithm and other algorithms which need calibration in advance, it is not needed to use complex calibration formulas, simplifying the calculation of the spatial dimensions, at the same time, preventing errors of a calibrator and a calibration process from being put into measurement results.

3. The three-dimensional vision measuring method of a planar array of a multi-camera group belongs to a multi-camera redundant and specifically structured arrangement method. As to algorithm of an epipolar in the binocular vision matching algorithm, the epipolar is directly simplified as a straight line parallel to an X axis and a Y axis, that is to say, all corresponding projection points of the measured object on respective imaging planes are on the straight line parallel to the X axis and the Y axis. We can make full matching for all measured points of the measured object, by directly translating, superimposing, and comparing, point by point, the pixel points of measured images of each pair in X-axis and Y-axis directions. This method can greatly simplify the complex algorithm of binocular matching.

Detailed descriptions are made below with one example.

Figure 8:
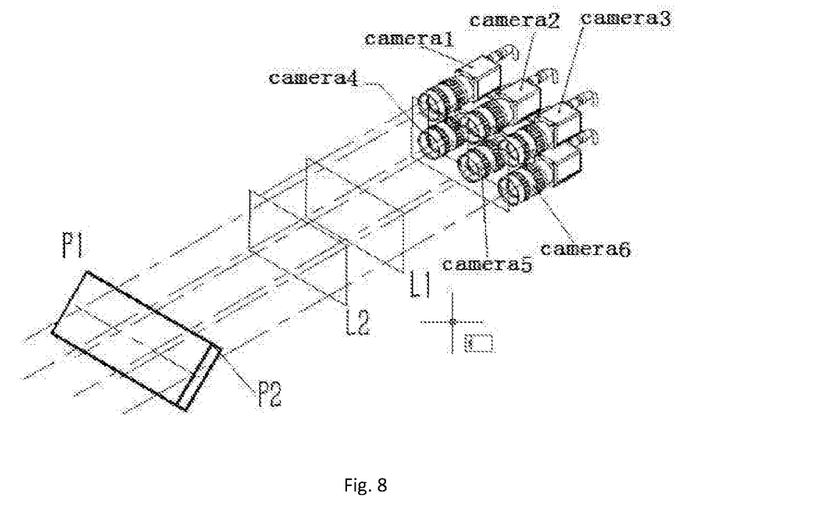
FIG. 8 is a schematic view of arrangement of a three-dimensional measuring system of a 3×2 camera array of the present invention.
Figure 9:
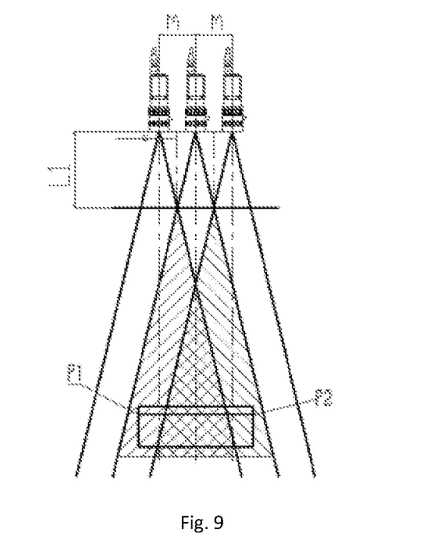
FIG. 9 is a top view of arrangement of a three-dimensional measuring system of the 3×2 camera array of FIG. 8.
Figure 10:
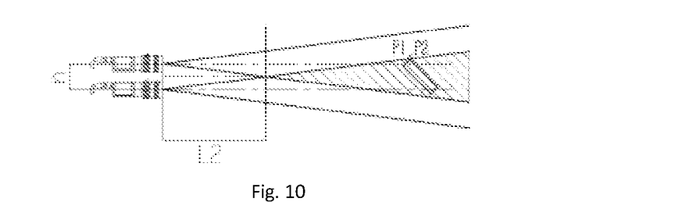
FIG. 10 is a side view of an arrangement of a three-dimensional measuring system of the 3×2 camera array of FIG. 8.

As shown in FIG. 8, FIG. 9, and FIG. 10, we use a camera 1, a camera 2, a camera 3, a camera 4, a camera 5, and camera 6 to form a three-dimensional measuring system of one 3×2 camera array; the camera 1, the camera 2, the camera 3, the camera 4, the camera 5, and the camera 6 are respectively called as 1, 2, 3, 4, 5, and 6 for short.

The six cameras we use have a sensor of the type of ⅔" CMOS, a pixel size of 5.5 μm, a resolution of 1024×2048, and a focal length of lens of 25 mm. Three cameras are arranged in the horizontal direction, and two cameras are arranged in the vertical direction, forming a three-dimensional measuring system of a 3×2 camera array, wherein a distance between cameras in the horizontal direction is m=60 mm, and a distance between cameras in the vertical direction is n=50 mm.

Let a measured object be a cuboid, and two measured points at the top of the cuboid be P1 and P2. It is seen from FIG. 9 (a top view) that the measured object cannot be placed within a view field smaller than L1, otherwise it cannot be ensured that the measured object is imaged within an intersecting area of view fields of at least two cameras in the horizontal direction. It is seen from FIG. 10 (a side view) that the measured object cannot be placed within a view field smaller than L2, otherwise it cannot be ensured that the measured object is imaged within an intersecting area of view fields of two cameras in the vertical direction. L1 and L2 can be called as the nearest measuring distances. It is seen from FIG. 8 that L2>L1. We take the area with a measuring distance smaller than L2 as a blind area of this measuring system. Except the blind area, areas indicated by oblique lines in the figure are just areas where measurement can be realized.

It is seen from the figures that the measured point P1 is located in a measuring area of 1245 four-camera group, and P2 is located in a measuring area of 2356 four-camera group. In this measuring system, we can firstly use the 1245 four-camera group for performing operations to calculate respective measured points of the measured object, including the point P1, which can be imaged by the 1245 four-camera group, and then, use the 2356 four-camera group for performing operations to calculate respective measured points of the measured object, including the point P2, which can be imaged by the 2356 four-camera group, finally, the results of the two calculations are comprehensively analyzed for preferably choosing data which can be measured in both groups, completing the three-dimensional measurement of all points.

As to parts of the three-dimensional stereoscopic surfaces of the measured object which cannot be imaged in the four-camera group, we can solve the problem by means of measuring several times or by adding other measuring systems. Furthermore, the present invention employs a processor, which is used for processing digital image data and three-dimensional point clouds. The processor may be coupled with the three-dimensional measuring system. Also, the processor can be used for achieve the measuring method.

Further variations of the method for measuring a three-dimensional object using a four-camera group may fall within the spirit of the claims, below. It will be appreciated that the inventions are susceptible to modification, variation and change without departing from the spirit thereof.

The invention claimed is:

1. A multi-camera measuring system for measuring object points of a three-dimensional object, comprising:
   at least one four-camera group arranged in a form of a 2×2 array of digital cameras, wherein the digital cameras comprise a camera A, a camera B, a camera C, and a camera D, with the cameras A, B, C and D being arranged on a same plane and being of identical models with identical lenses;
   focal points Oa, Ob, Oc, and Od on imaging optical axes of the respective four cameras A, B, C, and D forming a rectangular plane wherein each of the imaging optical axis of the cameras A, B, C and D is perpendicular to the rectangular plane; and
   at least one vertical laser, wherein the vertical laser is configured to be located on a perpendicular bisector of a connecting line Oa-Ob, and the horizontal laser is configured to be located on a perpendicular bisector of a connecting line Oa-Oc;
   at least one horizontal laser; and
   a processor configured to receive images acquired from the at least one four-camera group, and perform a matching operation for object points of a measured object, wherein when performing the matching operation, full matching is carried out for the object points of the measured object by translating, superimposing, and comparing, point by point, pixel points of measured images of two pairs of horizontal cameras and two pairs of vertical cameras in a horizontal direction and in a vertical direction;
   wherein:
   the camera A is located on a position horizontal to the camera B such that a horizontal location of a Charge-Coupled Device (CCD) in the camera A corresponds to a horizontal location of a CCD in the camera B;
   the camera C is located on a position horizontal to the camera D such that a horizontal location of a CCD in the camera C corresponds to a horizontal location of a CCD in the camera D;
   the camera A is located on a position vertical to the camera C such that a vertical location of the CCD in the camera A corresponds to a vertical location of the CCD in the camera C;

the camera B is located on a position vertical to the camera D such that a vertical location of the CCD in the camera B corresponds to a vertical location of the CCD in the camera D;

the camera group formed by cameras A, B, C and D comprises four digital cameras where a focal point on an imaging optical axis of a chosen camera and focal points on imaging optical axes of three adjacent cameras form one rectangular shape, forming a rectangular plane; and all of the imaging optical axis central lines of the four cameras are perpendicular to the rectangular plane;

and wherein:

in the at least one four-camera group, a distance between two adjacent cameras in a horizontal direction is "m"; and a distance between two adjacent cameras in a vertical direction is "n", and a range of "m" is 50 to 100 millimeters, and a range of "n" is 50 to 100 millimeters.

2. The multi-camera measuring system of claim 1, wherein the at least one four-camera group is provided in a form of 2×3, 2×4, 2×5, 3×2, 3×3, 3×4, 3×5 or 4×4 array of cameras.

3. The multi-camera measuring system of claim 1, wherein in the at least one four-camera group each of the cameras has:
   sensors of a type of ⅔" complementary metal-oxide semiconductor (CMOS);
   a pixel dimension of 5.5 μm;
   a resolution of 1024×2048; and
   a focal length of lens of 25 millimeters.

4. The multi-camera measuring system of claim 1, wherein the at least one four-camera group comprises a group of more than four cameras placed in a rectangular planar array, and the processor is configured to perform the matching operation with each group of four adjacent cameras.

5. The multi-camera measuring system of claim 1, wherein:
   the matching operation generates matched object point image coordinates; and
   the processor is configured to place coordinate expressions of object points PN in respective spaces of a measured object, and calculate coordinates of spatial locations of the respective object points.

6. The multi-camera measuring system of claim 5, wherein the processor is further configured to calculate a width dimension of each measured object through matched object points between two pairs of horizontal cameras, a height dimension of measured objects through matched object points between two pairs of vertical cameras, and a length dimension of the measured objects through matched object points between two pairs of horizontal cameras and two pairs of vertical cameras.

7. The multi-camera measuring system of claim 1, wherein all the dimensions having a redundant feature are compared and analyzed on redundant data, improving measuring accuracy and precision rate.

8. The multi-camera measuring system of claim 1, wherein the processor is further configured to, according to obtained coordinates of the spatial locations of respective object points, calculate other three-dimensional dimensions of the measured objects which need to be specially measured to form three-dimensional point clouds and to establish a three-dimensional point clouds graph for performing three-dimensional stereoscopic reproduction.

9. A method of measuring object points on a three-dimensional object, comprising the steps of:
   providing a three-dimensional measuring system comprising:
      at least one four-camera group arranged in a form of a 2×2 array of digital cameras, wherein the digital cameras comprise a camera A, a camera B, a camera C, and a camera D, with the cameras A, B, C and D being arranged on a same plane and being of identical models with identical lenses, forming a rectangular shape;
      focal points $O_a$, $O_b$, $O_c$, and $O_d$ on imaging optical axes of the four cameras A, B, C and D, forming a rectangular plane wherein each of the imaging optical axis central lines of the cameras A, B, C and D, respectively, is perpendicular to the rectangular plane;
      and wherein:
         the camera A is located on a position horizontal to the camera B, the camera C is located on a position horizontal to the camera D, the camera A is located on a position vertical to the camera C, and the camera B is located on a position vertical to the camera D; and
         dimensions of the rectangular shape and parameters of the cameras and the lenses are selected by considering factors including accuracy of the measuring system and a size of a measured object, while ensuring that the measured object is capable of simultaneously having corresponding imaging points on the four cameras, and if the measured object is out of the imaging range, it is needed to increase the measuring cameras in pair, forming an array of the measuring cameras;
      a processor configured to receive images acquired from the at least one four-camera group, and perform a matching operation for object points of a measured object, wherein when performing the matching operation, full matching is carried out for the object points of the measured object by translating, superimposing, and comparing, point by point, pixel points of measured images of two pairs of horizontal cameras and two pairs of vertical cameras in a horizontal direction and in a vertical direction, respectively;
   placing each of the cameras A, B, C and D in a field of view that enables simultaneous imaging;
   selecting dimensions of the rectangular shape and parameters of the cameras A, B, C and D and the lenses are selected by considering factors including accuracy of the measuring system and a size of a measured object, wherein when high measuring accuracy is required, it is needed to improve resolution of the cameras and increase focal length of the lenses;
   using the measuring system, acquiring images of object points of the three-dimensional object;
   after acquisition of images is completed, performing a matching operation for object points of the images captured by the camera group which comprises:
      a binocular stereoscopic vision measurement, wherein one of the object points of the measured object is a known point and a point corresponding to the known point is disposed on two or more alternate images;
   connecting the known point and the corresponding points on the two or more alternate images to form one plane;

epipolar lines being defined as lines that intersect with the one plane and with the two or more alternate images, wherein the corresponding points are located on the epipolar lines and all corresponding points of the measured object are parallel to the horizontal direction or the vertical direction; and processing the acquired images to form a three-dimensional stereoscopic reproduction;

provided that where the at least one four-camera group comprises a group of more than four cameras placed in a rectangular planar array, and the processor is configured to perform the matching operation with each group of four adjacent cameras, finding out all object points whose spatial locations need to be calculated;

according to matched object point image coordinates, calculating coordinates of a spatial location of each of the object points, wherein using the processor, matched object point image coordinates are put into coordinate expressions of any object point $P_N$ in a space of the measured object, to calculate coordinates of spatial locations of respective object points;

wherein the processor is further configured to calculate a width dimension of each measured object through matched object points between two pairs of horizontal cameras, a height dimension of measured objects through matched object points between two pairs of vertical cameras, and a length dimension of the measured objects through matched object points between two pairs of horizontal cameras and two pairs of vertical cameras wherein all of the dimensions above, having a redundant feature, are compared and analyzed on redundant data, improving measuring accuracy and precision rate;

according to obtained coordinates of the spatial locations of respective object points, calculating other three-dimensional dimensions of the measured object which need to be specially measured to form three-dimensional point clouds and establish a three-dimensional point clouds graph for creating the three-dimensional stereoscopic reproduction.

10. The method of claim 9, wherein the three-dimensional measuring system further comprises:
at least one vertical laser; and at least one horizontal laser;
wherein the vertical laser is configured to be located on a perpendicular bisector of a connecting line $O_a$-$O_b$, and the horizontal laser is configured to be located on a perpendicular bisector of a connecting line $O_a$-$O_c$.

11. The method of claim 9, wherein parameters of the cameras and the lenses, and the length and width dimensions of the rectangular shape are selected based on:
when a measuring distance is unchanged, the larger a volume of the measured object, the shorter the focal lengths required by the lenses; when the measuring distance is increased, a measurable range is also correspondingly increased; and
a measuring resolution is improved in a way of: improving the resolutions of the cameras, decreasing the measuring distance, and in a condition that the measuring distance is unchanged, decreasing values of the focal lengths, and increasing dimensions of an array of centers of the optical axes of the four-camera group.

12. The method of claim 9, wherein according to the matched object point image coordinates, formulas of calculating coordinates of the spatial location of the object point are:

with a central point O of a rectangular plane of the focal points $O_a$, $O_b$, $O_c$, and $O_d$ of a group of four cameras, the camera a, the camera B, the camera C, and the camera D, serving as an origin, setting a triangular coordinate system of the space of the measured object, wherein X is a horizontal direction, Y is a vertical direction, and Z is a length or depth direction;

coordinates of a spatial location of a same point, point $P_1$, of the measured object are $P_1$ ($P_{1x}$, $P_{1y}$, $P_{1z}$), and corresponding imaging points of the spatial three-dimensional coordinates of the point $P_1$ in the group of four cameras, the camera A, the camera B, the camera C, and the camera D are $P_{1a}$ ($P_{1ax}$, $P_{1ay}$), $P_{1b}$ ($P_{1bx}$, $P_{1by}$), $P_{1c}$ ($P_{1cx}$, $P_{1cy}$), and $P_{1d}$ ($P_{1dx}$, $P_{1dy}$), relational expressions of location coordinates are as follows:

a horizontal operation formula of the camera A and the camera B:

$$P_{1x} = \frac{m(P_{1ax} + P_{1bx})}{2(P_{1bx} - P_{1ax})}$$

a horizontal operation formula of the camera C and the camera D:

$$P_{1x} = \frac{m(P_{1cx} + P_{1dx})}{2(P_{1dx} - P_{1cx})|}$$

a vertical operation formula of the camera A and the camera C:

$$P_{1y} = \frac{n(P_{1cy} + P_{1ay})}{2(P_{1cy} - P_{1ay})}$$

a vertical operation formula of the camera B and the camera D:

$$P_{1y} = \frac{n(P_{1by} + P_{1dy})}{2(P_{1dy} - P_{1by})}$$

a depth operation formula of the camera A and the camera B:

$$P_{1z} = \frac{mf}{P_{1cx} - P_{1dx}}$$

a depth operation formula of the camera C and the camera D:

$$P_{1z} = \frac{mf}{P_{1cx} - P_{1dx}}$$

a depth operation formula of the camera A and the camera C:

$$P_{1z} = \frac{nf}{P_{1ay} - P_{1cy}}$$

a depth operation formula of the camera B and the camera D:

$$P_{1z} = \frac{nf}{P_{1by} - P_{1dy}}$$

wherein: "m" is an $O_a$-$O_b$ length of the rectangular plane; "n" is an $O_a$-$O_c$ length of the rectangular plane, and "f" is the focal length of the four cameras.

13. The method of claim 12, wherein a general expression for calculating coordinates of an object point, the spatial location coordinates of $P_N$, is:

$P_N(P_{Nx}, P_{Ny}, P_{Nz})$, where $N = 1, 2, 3, 4, 5, \ldots$ ;

$$= \begin{cases} P_{Nx} = \dfrac{m(P_{Nax} + P_{Nbx})}{2(P_{Nbx} - P_{Nax})} = \dfrac{m(P_{Ncx} + P_{Ndx})}{2(P_{Ndx} - P_{Ncx})} \\ P_{Ny} = \dfrac{n(P_{Ncy} + P_{Nay})}{2(P_{Ncy} - P_{Nay})} = \dfrac{n(P_{Nby} + P_{Ndy})}{2(P_{Ndy} - P_{Nby})} \\ P_{Nz} = \dfrac{mf}{P_{Nax} - P_{Nbx}} = \dfrac{mf}{P_{Ncx} - P_{Ndx}} = \dfrac{nf}{P_{Nay} - P_{Ncy}} = \dfrac{nf}{P_{Nby} - P_{Ndy}} \end{cases}$$

wherein
let the focal points of the four cameras, the camera A, the camera B, the camera C, and the camera D, be $O_a$, $O_b$, $O_c$, and $O_d$, wherein the focal points $O_a$, $O_b$, $O_c$, and $O_d$ are on the same plane and form one rectangular plane, wherein let the $O_a$-$O_b$ length of the rectangular plane be "m" and the $O_a$-$O_c$ length be "n", and the optical axes of the four cameras are parallel to each other and perpendicular to the rectangular plane; the group of four cameras, the camera A, the camera B, the camera C, and the camera D, use identical CCD for imaging, and also identical lenses, with the focal length of the four cameras set to be "f";
setting a rectangular coordinate system of the space of the measured object, taking the central point O of the rectangular plane of $O_a$, $O_b$, $O_c$, and $O_d$ as the origin, wherein X is a horizontal direction parallel to an edge $O_a$-$O_b$ of the rectangular shape, Y is a vertical direction parallel to an edge $O_a$-$O_c$ of the rectangular shape, and Z is a length or depth direction and points towards the measured object; and
let any object point in the measured object be $P_N$, and coordinates of projection points of $P_N$ on imaging planes of the group of four cameras, the camera A, the camera B, the camera C, and the camera D, be $P_{Na}$ ($P_{Nax}$, $P_{Nay}$), $P_{Nb}$ ($P_{Nbx}$, $P_{Nby}$), $P_{Nc}$ ($P_{Ncx}$, $P_{Ncy}$), and $P_{Nd}$ ($P_{Ndx}$, $P_{Ndy}$), and then, let coordinates of a spatial location of the point $P_N$ be $P_N$ ($P_{Nx}$, $P_{Ny}$, $P_{Nz}$).

14. An feature-point three-dimensional measuring system of a planar array of a four-camera group, comprising:
at least one four-camera group, the group formed by four digital cameras, wherein
a four-camera group formed by four digital cameras is arranged in a form of a 2×2 array;
the four digital cameras comprise a camera a, a camera b, a camera c, and a camera d, wherein the camera a, the camera b, the camera c, and the camera d are arranged on a same plane;
focal points $O_a$, $O_b$, $O_c$, and $O_d$ on imaging optical axes of the four cameras, the camera a, the camera b, the camera c, and the camera d, are on a same plane and form one rectangular shape, forming a rectangular plane; all of imaging optical axis central lines of the four cameras, the camera a, the camera b, the camera c, and the camera d, are perpendicular to the rectangular plane;
the four cameras, the camera a, the camera b, the camera c, and the camera d, are of identical models and have identical lenses;
the camera a is located on a position horizontal to the camera b, and an extension line of a row where an X-coordinate value of CCD in the camera a is located coincides with a row where a corresponding X-coordinate value of CCD in the camera b is located;
the camera c is located on a position horizontal to the camera d, and an extension line of a row where an X-coordinate value of CCD in the camera c is located coincides with a row where a corresponding X-coordinate value of CCD in the camera d is located;
the camera a is located on a position vertical to the camera c, and an extension line of a column where a Y-coordinate value of CCD in the camera a is located coincides with a column where a corresponding Y-coordinate value of CCD in the camera c is located;
the camera b is located on a position vertical to the camera d, and an extension line of a column where a Y-coordinate value of CCD in the camera b is located coincides with a column where a corresponding Y-coordinate value of CCD in the camera d is located;
the four-camera group formed by the four digital cameras is formed by four digital cameras where a focal point on an imaging optical axis of a chosen camera and focal points on imaging optical axes of three adjacent cameras form one rectangular shape, forming a rectangular plane, and all of the imaging optical axis central lines of the four cameras are perpendicular to the rectangular plane;
and wherein the feature-point three-dimensional measuring system further comprises:
at least one vertical laser, wherein the vertical laser is configured to be located on a perpendicular bisector of a connecting line Oa-Ob, and the horizontal laser is configured to be located on a perpendicular bisector of a connecting line Oa-Oc;
at least one horizontal laser; and
a processor configured to receive images acquired from the at least one four-camera group, and perform a matching operation for object points of a measured object, wherein when performing the matching operation, full matching is carried out for the object points of the measured object by translating, superimposing, and comparing, point by point, pixel points of measured images of two pairs of horizontal cameras and two pairs of vertical cameras in a horizontal direction and in a vertical direction;
and wherein in the four-camera group, a distance between two adjacent cameras in a horizontal direction is "m"; and a distance between two adjacent cameras in a vertical direction is "n", and a range of "m" is 50 to 100 millimeters, and a range of "n" is 50 to 100 millimeters.

* * * * *